United States Patent
Flaβpöhler et al.

(10) Patent No.: US 9,914,093 B2
(45) Date of Patent: Mar. 13, 2018

(54) METHOD FOR HEAT-TREATING A MATERIAL FLOW AND FOR CLEANING RESULTING EXHAUST GASES

(71) Applicants: ThyssenKrupp Industrial Solutions AG, Essen (DE); ThyssenKrupp AG, Essen (DE)

(72) Inventors: Melanie Flaβpöhler, Dortmund (DE); Kathrin Rohloff, Hamburg (DE); Timo Stender, Fröndenberg (DE)

(73) Assignees: THYSSENKRUPP INDUSTRIAL SOLUTIONS AG, Essen (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/114,183

(22) PCT Filed: Jan. 22, 2015

(86) PCT No.: PCT/EP2015/000112
§ 371 (c)(1),
(2) Date: Jul. 26, 2016

(87) PCT Pub. No.: WO2015/110264
PCT Pub. Date: Jul. 30, 2015

(65) Prior Publication Data
US 2016/0339381 A1 Nov. 24, 2016

(30) Foreign Application Priority Data

Jan. 27, 2014 (DE) .................... 10 2014 100 896

(51) Int. Cl.
*B01D 53/34* (2006.01)
*B01D 53/86* (2006.01)
*C04B 7/47* (2006.01)
*F27D 17/00* (2006.01)
(Continued)

(52) U.S. Cl.
CPC ....... *B01D 53/343* (2013.01); *B01D 46/4218* (2013.01); *B01D 53/8603* (2013.01);
(Continued)

(58) Field of Classification Search
None
See application file for complete search history.

(56) References Cited

U.S. PATENT DOCUMENTS 5,922,103 A * 7/1999 Schwab .................. B03C 3/014
95/16
2006/0053775 A1 * 3/2006 Powell ...................... F01N 3/02
60/286

(Continued)

FOREIGN PATENT DOCUMENTS

AT 505542 A4 2/2009
CN 202860408 * 4/2013
(Continued)

*Primary Examiner* — Sheng H Davis
(74) *Attorney, Agent, or Firm* — thyssenkrupp North America, Inc.

(57) ABSTRACT

Methods for the heat treatment of a material flow and the cleaning of resulting exhaust gases are disclosed. The material flow may be preheated in a preheating zone, burned in a sintering zone, and cooled in a cooling zone. Exhaust gases of the sintering zone may flow through a preheater and be used for preheating the material flow. The exhaust gases leaving the preheater may be cooled at least partially in a comminuting device in interconnected operation or at least partially in a cooling device in direct operation. Exhaust gases may then be at least partly dedusted in a dust filter. A temperature of the dedusted exhaust gas may then be raised before the exhaust gas is cleaned of pollutants in at least one catalyst. A temperature at which the exhaust gases flow through the catalyst in direct operation may be higher, at
(Continued)

least in phases, than a temperature at which the exhaust gases flow through the catalyst in interconnected operation.

16 Claims, 2 Drawing Sheets

(51) Int. Cl.
    *F27B 7/20* (2006.01)
    *B01D 46/42* (2006.01)
    *B01D 53/90* (2006.01)

(52) U.S. Cl.
    CPC ..... *B01D 53/8625* (2013.01); *B01D 53/8631* (2013.01); *B01D 53/8634* (2013.01); *B01D 53/8668* (2013.01); *B01D 53/8696* (2013.01); *B01D 53/90* (2013.01); *C04B 7/47* (2013.01); *F27B 7/20* (2013.01); *F27B 7/2025* (2013.01); *F27D 17/001* (2013.01); *F27D 17/004* (2013.01); *F27D 17/008* (2013.01); *B01D 53/864* (2013.01); *B01D 53/8687* (2013.01); *B01D 2257/7027* (2013.01); *B01D 2258/0233* (2013.01); *B01D 2279/35* (2013.01); *Y02P 40/121* (2015.11)

(56) References Cited

U.S. PATENT DOCUMENTS

| | | | | |
|---|---|---|---|---|
| 2006/0234173 | A1* | 10/2006 | Smith | F23J 15/003 431/5 |
| 2007/0006570 | A1* | 1/2007 | Gieshoff | B01D 53/9495 60/277 |
| 2010/0031821 | A1* | 2/2010 | Jepsen | C04B 7/47 95/273 |
| 2010/0037678 | A1* | 2/2010 | Chothani | G01N 27/14 73/25.01 |
| 2010/0307388 | A1* | 12/2010 | Secklehner | B01D 53/8631 110/217 |
| 2013/0112113 | A1* | 5/2013 | Sagawa | C04B 7/52 106/638 |
| 2014/0087319 | A1* | 3/2014 | Leibinger | B01D 53/343 432/9 |

FOREIGN PATENT DOCUMENTS

| | | |
|---|---|---|
| DE | 102010004011 B3 | 6/2011 |
| DE | 102011050677 A1 | 11/2012 |
| DE | 102011050677 * | 8/2014 |

* cited by examiner ary, this patent covers all
METHOD FOR HEAT-TREATING A MATERIAL FLOW AND FOR CLEANING RESULTING EXHAUST GASES

CROSS REFERENCE TO RELATED APPLICATIONS

This application is a U.S. National Stage Entry of International Patent Application Serial Number PCT/EP2015/000112, filed Jan. 22, 2015, which claims priority to German Patent Application No. DE 10 2014 100 896.0 filed Jan. 27, 2014, the entire contents of both of which are incorporated herein by reference.

FIELD

The present disclosure relates to methods for heat-treating a material flow and for cleaning resulting exhaust gases.

BACKGROUND

Such methods are used, for example, in cement plants or plants for producing propane as well as in further plants from the minerals industry field. The exhaust gases leaving the preheater conventionally have a temperature of approximately from 300 to 400° C. However, the dust filters arranged downstream typically operate only in a lower temperature range, for example below 260° C. or even below 200° C. It is further desirable to use the heat of the exhaust gas as far as possible. Operations are therefore carried out as far as possible in a so-called interconnected operation, in which the hot exhaust gas from the preheater is used in a comminuting, pelletizing and/or drying device, in particular a combined grinding and drying system. The exhaust gas thereby conventionally cools to a temperature of approximately from 90 to 120° C. In the operating phases in which interconnected operation is not possible, the kiln is operated in so-called direct operation, in which the exhaust gas is cooled to a temperature suitable for the dust filter in a cooling device.

In the catalyst arranged downstream, pollutants, for example nitrogen oxide, are reduced. For operation of the catalysts, a so-called tail-end configuration, in which the catalyst is arranged after the last dust filter, has can be used, in which the action of the catalyst is not impaired or is only slightly impaired by dust particles contained in the exhaust gas. However, the conventional catalysts used at present require exhaust gas temperatures of approximately 250° C., which thus require the temperature of the exhaust gases to be raised downstream of the dust filter. It is known to raise the temperature of the dedusted exhaust gas at least partly by means of the waste heat from the cooling zone. By means of temperature control, the temperature of the exhaust gases flowing through the catalyst is adjusted to a predetermined value of, for example, approximately 260°, irrespective of whether the kiln is in direct or interconnected operation.

Catalysts are used in exhaust gas cleaning for reducing nitrogen- or carbon-containing compounds, such as $NO_x$, $NH_3$, CO, $C_xH_y$, as well as dioxins and furans. Apart from the exhaust gas temperature, which is between 150 and 600° C. depending on the type of catalyst and the compounds to be reduced, important factors for efficient catalytic reduction are catalyst poisons, which can reduce the efficiency of the catalyst by chemical reactions, and particles or molecules which can reduce the effective surface area by blocking the pores. The reduction in catalytic activity can also be influenced, for example, directly by the catalyst by the catalytic oxidation of sulfur dioxide contained in the flue gas to sulfur trioxide and subsequent reaction with ammonia to ammonium bisulfate. The influence of the pollutants and the operating temperature of the catalyst are directly related. The formation of ammonium bisulfate is thus critical in particular at low temperatures, for example below 180° C. Mercury, for example, also adsorbs at low operating temperatures. Further pollutants which can adversely affect the activity of the catalyst and which occur in the exhaust gases of clinker production are, for example, alkalis, heavy metals or fine dusts. The negative influence of the pollutants is in some cases reversible. If the operating temperature is increased, ammonium salts that form, for example, or other adsorbed molecules can decompose. The baking out of pollutants in tail-end catalysts by a temperature increase is used, for example, in power plant technology and in waste combustion plants. However, the energy requirement increases as a result, since a high exhaust gas volume is to be heated.

DETAILED DESCRIPTION

Figure 1:
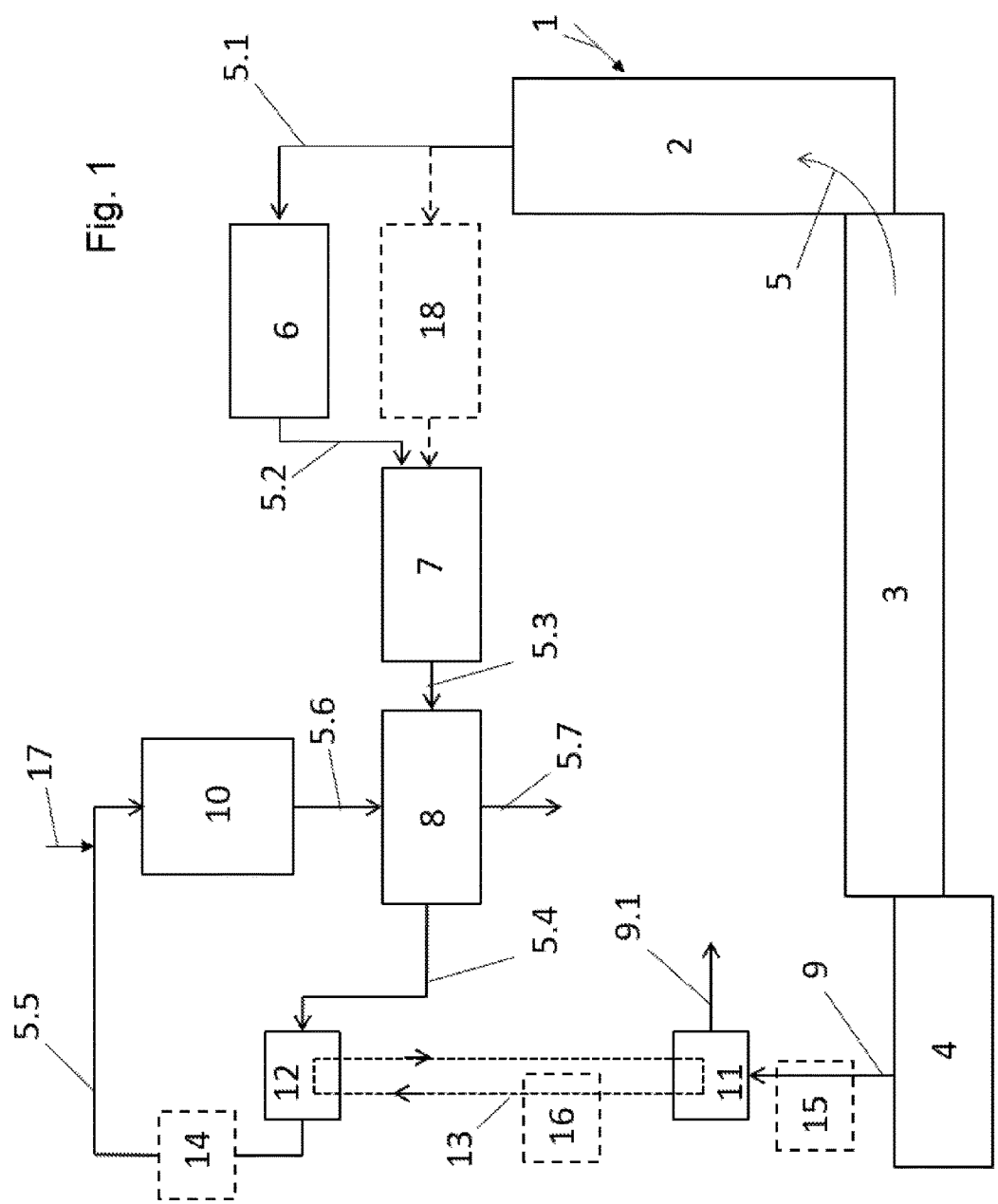
FIG. 1 is a diagram of an example system for heat-treating a material flow in interconnected operation and for cleaning resulting exhaust gases.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The present disclosure generally concerns methods for heat-treating a material flow and for cleaning resulting exhaust gases. In some examples, a material flow may be preheated in a preheating zone, burned or sintered in a sintering zone, and cooled in a cooling zone. At least the exhaust gases of the sintering zone may flow through the preheater and may be used for preheating the material flow. The exhaust gases leaving the preheater can be dedusted and cleaned of pollutants in at least one catalyst.

One example object of the present disclosure is to optimize the cleaning of exhaust gases from the heat treatment of a material flow in respect of the energy to be applied.

One example method of the present disclosure concerns the heat treatment of a material flow and the cleaning of resulting exhaust gases, wherein a material flow is preheated in a preheating zone, burned in a sintering zone and cooled in a cooling zone, wherein at least the exhaust gases of the sintering zone flow through the preheater and are used for preheating the material flow, and wherein the exhaust gases leaving the preheater are cooled at least partially in a drying, pelletizing and/or comminuting device in interconnected operation or at least partially in a cooling device in direct operation, before they are at least partly dedusted in a dust filter, and wherein the temperature of the at least partly dedusted exhaust gas is then raised again before the exhaust gas is cleaned of pollutants in at least one catalyst. The temperature with which the exhaust gases flow through the catalyst in direct operation is to be higher, at least in phases, than the temperature with which the exhaust gases flow through the catalyst in interconnected operation.

The invention makes use of the fact that, in direct operation, a higher temperature level of the exhaust gas is available as compared with interconnected operation. While increasing deactivation of the catalyst can be allowed in interconnected operation, in direct operation the catalyst is operated with a higher temperature of the exhaust gases at least in phases, in order to permit reactivation of the catalyst.

The temperature with which the exhaust gases flow through the catalyst in direct operation is to be advantageously at least 10° C., preferably at least 20° C. and most preferably at least 30° C. higher than the temperature of the exhaust gases in interconnected operation. The temperature difference downstream of the dust filter between interconnected operation and direct operation in the phases in which the exhaust gases flow through the catalyst with higher temperatures is advantageously in the range of from 10 to 100° C., preferably in the range of from 20 to 80° C. This can be influenced inter alia via the mentioned cooling device. Preferably, the difference in temperature of the exhaust gases flowing through the catalyst between interconnected operation and direct operation corresponds to the difference in temperature of the exhaust gases flowing through the dust filter in interconnected operation and direct operation, +/−10° C.

The temperature of the exhaust gases can be increased between the dust filter and the catalyst by heat displacement from the method for heat-treating the material flow, by addition of hot gases and/or by additional firing. Furthermore, at least part of the temperature increase of the exhaust gases between the dust filter and the catalyst can be effected by heat exchange with the exhaust gases leaving the catalyst. Gas-gas heat exchangers in particular can be used for increasing the temperature.

There come into consideration as catalysts in particular those which reduce nitrogen- and/or carbon-containing compounds. In a particularly energy-saving mode of operation, the temperature of the exhaust gases is increased only to the extent that the catalyst is exposed in interconnected operation to a creeping deactivation which can be compensated for again at least partly in direct operation at least in phases by corresponding reactivation of the catalyst at higher temperatures. The dimensioning of the catalyst is ideally such that the permitted emission limits can be met throughout the operating period. As a result of over-dimensioning, the catalytic activity of the catalyst can partly be reduced by pollutants at lower temperatures in interconnected operation. In order that a predetermined pollutant reduction rate of the catalyst is still achieved even at the end of interconnected operation, it is provided that the deactivation that occurs in interconnected operation of the catalyst is compensated for by a corresponding over-dimensioning of the catalyst. The catalysts to be used in the invention are designed in interconnected operation for exhaust gases having a temperature in the range of from 150° to 600° C., preferably from 200° to 500° C. and most preferably from 250° to 450° C. It is possible in particular also to use catalysts through which exhaust gases having temperatures of at least 300° C., preferably at least 320° C., are to flow in interconnected operation. Specifically in the case of catalysts which must be operated with such high temperatures (>300° C.), the amount of heat available from the process, optionally with additional firing, is sufficient to operate the catalyst with sufficient pollutant reduction rates. However, a certain deactivation of the catalyst over time must thereby be accepted. Such a mode of operation thus repeatedly requires phases in which the catalyst is reactivated with higher temperatures.

Switching from interconnected operation to direct operation, in which reactivation is to occur, advantageously takes place in dependence on the pollutant reduction rate of the catalyst or after a predetermined time. In order that the exhaust gas which flows through the catalyst in direct operation has as high a temperature as possible, cooling is carried out in the cooling device only to the maximum temperature suitable for the dust filter. The cooling device can be, for example, an evaporative cooling tower, a heat extraction or a device for power generation.

Depending on the type of catalyst, an additive suitable for reducing pollutants, for example an ammonia-containing additive, can be injected into or added to the exhaust gas upstream of the catalyst.

Further embodiments of the invention will be explained in greater detail by means of the following description and the drawing.

The system shown in FIG. 1 serves, for example, to produce cement clinker by heat treatment of a material flow 1 formed by cement raw meal, which is preheated in a preheating zone 2 and burned in a sintering zone 3 and finally cooled in a cooling zone 4. The preheating zone 2 is, for example, a multi-stage gas suspension preheater which is optionally followed, upstream of the sintering zone 3, by an optional calciner. The sintering zone 3 is conventionally formed by a rotary kiln, while the cooling zone 4 is in the form of a sliding grate, for example. Exhaust gases 5 form in the sintering zone 3, which exhaust gases flow through the preheater 3, and beforehand optionally through a calciner which may be present, and which serve to preheat or precalcine the material flow 1. The exhaust gases 5.1 leaving the preheater 1 conventionally have a temperature of approximately from 300 to 400° C. This heat is used in interconnected operation in a comminuting device 6, which is in the form, for example, of a combined grinding and drying system for preparing the cement raw meal to be fed to the preheater.

Downstream of the comminuting device 6, the exhaust gas 5.2 has a temperature of only approximately from 90 to 120° C. and can be fed to a conventional dust filter 7 (woven or electrostatic filter). In the dust filter, the exhaust gas 5.2 is dedusted at least partly, but preferably to a residual dust content corresponding to emission regulations. However, the dedusted exhaust gas 5.3 is still loaded with especially gaseous pollutants, which are reduced in a catalyst 10. For efficient pollutant reduction, the exhaust gases fed to the catalyst must be fed in a predetermined temperature range, which is dependent on the catalyst used. In the case of many catalysts in use, that temperature window is conventionally between 150° and 600° C. In any case, the temperature of the dedusted exhaust gases 5.3 must be raised again. It is advantageous if the heat available from the process is first used for this purpose. In the embodiment shown, the dedusted exhaust gas 5.3 is therefore first heated further by means of a gas-gas heat exchanger 8 using exhaust gases 5.6 from the catalyst 10. However, since this heat transfer will not be sufficient to reach the temperature required for the catalyst 10, a further heat displacement from the method is provided by using cooler waste air 9 produced in the cooling zone 4 to heat the exhaust gases 5.4 further.

In the embodiment shown, heat transfer between the cooler waste air 9 and the exhaust gas 5.4 is achieved via two heat exchangers 11 and 12 and a heat circuit 13 arranged therebetween. The cooled cooler waste air 9.1 is discharged and optionally used elsewhere. Of course, instead of two heat exchangers and a heat circuit, it is also possible to use only one heat exchanger, if the spatial proximity allows it.

The exhaust gas 5.5 further heated in that manner then has the required temperature for the catalyst 10. Should that not be the case, further heating can be carried out by additional firing 14, for example. Additional firing 15 could also be provided for further heating of the cooler waste air 9. It would further be conceivable to provide additional firing 16 in the region of the heat circuit 13. In any case, it must be ensured in a suitable manner that the exhaust gas 5.5 fed to the catalyst 10 has a temperature level suitable for pollutant reduction. The required temperature level depends on the catalyst used. There is preferably used a catalyst at which nitrogen- and/or carbon-containing compounds are reduced. For that purpose, an additive 17 suitable for reducing pollutants, for example an ammonia-containing additive, can additionally be fed to the exhaust gas 5.5 upstream of the catalyst 10.

Figure 2:
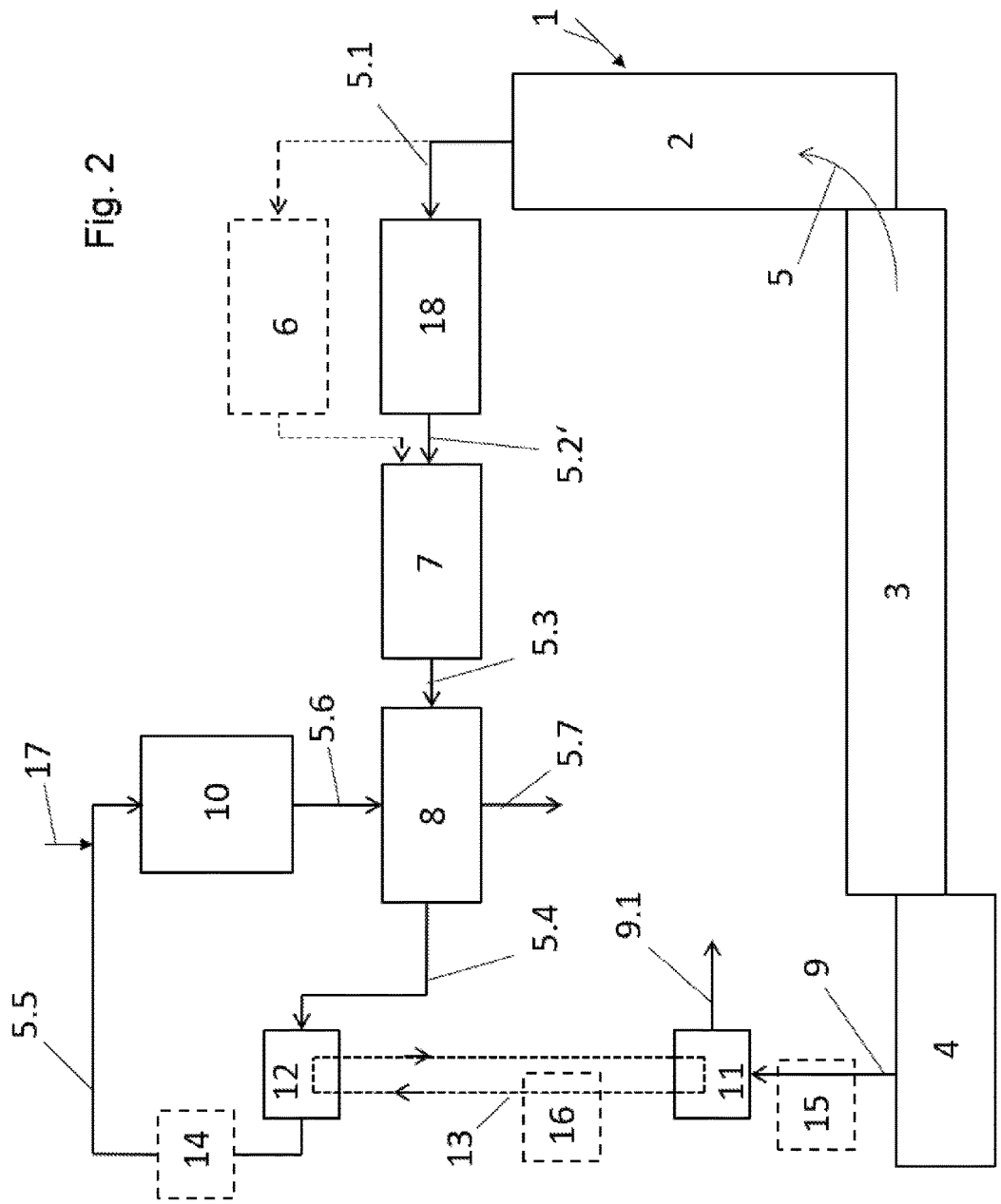
FIG. 2 is a block diagram of an example system for heat-treating a material flow in direct operation and for cleaning resulting exhaust gases.

FIG. 2 shows the system shown in FIG. 1 in so-called direct operation, which differs from interconnected operation in that the exhaust gas 5.1 is guided not via the comminuting device 6 but via a cooling device 18. Direct operation is used, for example, when the comminuting device is not available for maintenance purposes or has been switched off for other reasons. However, since the dust filter 7 does not withstand the high temperatures of the exhaust gas 5.1 leaving the preheater, the temperature of the exhaust gas must be lowered in the cooling device 18 to an extent that is still acceptable for the dust filter 7. Since higher temperatures are in any case required again for the downstream catalyst, the exhaust gas 5.1 will be cooled in the cooling device 18 only to the extent that the cooled exhaust gas 5.2' has a temperature that is as high as possible but is still acceptable for the dust filter 7. Otherwise, the further treatment of the exhaust gas takes place analogously to interconnected operation with corresponding dedusting and temperature increase as well as cleaning in the catalyst.

However, it is provided to operate the catalyst 10 at a different temperature level. If exhaust gases at a higher temperature flow through the catalyst, it is possible to reactivate a partly deactivated catalyst again. The higher temperature level available upstream of the dust filter 7 is used for that purpose, so that reactivation of the catalyst takes place during the periods in which the plant is being operated in direct operation, wherein the catalyst is exposed to higher temperatures of the exhaust gases in direct operation only when reactivation is required. In other words, even in direct operation, the temperature of the exhaust gas will not be increased unnecessarily above a temperature that is sufficient for pollutant reduction if the catalyst still ensures a sufficient pollutant reduction rate. The pollutant reduction rate of the catalyst will therefore be determined in the exhaust gas streams 5.6 or 5.7 downstream of the catalyst 10 in order to effect at least partial reactivation of the catalyst, if required, in direct operation at higher temperatures.

The additional energy requirement for reactivation, for example via the additional firing 14, 15, 16, which can be performed, for example, by natural gas burners, is reduced at least partially by using the higher energy level available in direct operation. Furthermore, it is also conceivable that the method for heat-treating the material flow is so operated in direct operation that a greater amount of heat is available for increasing the temperature of the exhaust gas. This can be effected, for example, by changing the fuel supply or adjusting the amounts of air in the system.

What is claimed is:

1. A method for heat-treating a material flow and for cleaning resulting exhaust gases, wherein the material flow is preheated in a preheating zone, burned in a sintering zone, and cooled in a cooling zone, the method comprising:
   preheating the material flow using exhaust gases of the sintering zone that flow through a preheater;
   switching between cooling exhaust gases that leave the preheater at least partially in a drying, pelletizing, and/or comminuting device in interconnected operation and cooling exhaust gases that leave the preheater at least partially in a cooling device in direct operation;
   dedusting the cooled exhaust gases at least partially in a dust filter;
   increasing a temperature of the dedusted exhaust gases; and
   removing pollutants from the exhaust gases with the increased temperature in at least one catalyst, wherein a temperature at which the exhaust gases flow through the at least one catalyst in direct operation is higher at least at one point in time than a temperature at which the exhaust gases flow through the at least one catalyst in interconnected operation.

2. The method of claim 1 wherein the temperature at which the exhaust gases flow through the at least one catalyst in direct operation is at least 10 degrees Celsius higher than the temperature of the exhaust gases in interconnected operation at least at one point in time.

3. The method of claim 1 wherein increasing the temperature of the dedusted exhaust gases occurs at least in part by heat displacement from a method of heat-treating the material flow by adding at least one of hot gases or firing.

4. The method of claim 1 wherein increasing the temperature of the dedusted exhaust gases occurs at least in part by heat exchange with the exhaust gases leaving the at least one catalyst.

5. The method of claim 1 wherein increasing the temperature of the dedusted exhaust gases occurs at least in part by at least one gas-gas heat exchanger.

6. The method of claim 1 further comprising reducing at least one of nitrogen-containing compounds or carbon-containing compounds in the at least one catalyst.

7. The method of claim 1 further comprising exposing the at least one catalyst to a deactivation in interconnected operation, wherein in direct operation at least partial reactivation of the at least one catalyst occurs at least at one point in time.

8. The method of claim 7 wherein in direct operation the method for heat-treating the material flow generates heat that is used to increase the temperature of the exhaust gas downstream of the dust filter.

9. The method of claim 7 wherein the deactivation that occurs in interconnected operation of the at least one catalyst is compensated for by utilizing the at least one catalyst that has dimensions such that a predetermined pollutant reduction rate of the at least one catalyst is achieved at an end of interconnected operation.

10. The method of claim 9 wherein the deactivation is gradual.

11. The method of claim 7 wherein the deactivation is gradual.

12. The method of claim 1 wherein the exhaust gases flowing through the at least one catalyst in interconnected operation have a temperature of at least 300 degrees Celsius.

13. The method of claim 1 wherein switching from interconnected operation to direct operation is based on a pollutant reduction rate of the at least one catalyst or a predetermined amount of time.

14. The method of claim 1 wherein in direct operation the exhaust gases that leave the preheater are cooled in the cooling device only to a maximum temperature suitable for the dust filter.

15. The method of claim 1 further comprising injecting an additive for reducing pollutants into the exhaust gas upstream of the at least one catalyst.

16. The method of claim 1 further comprising controlling the cooling device at times of catalyst reactivation so as to increase a temperature of waste air.

* * * * *